United States Patent
Shin et al.

(10) Patent No.: US 7,330,601 B2
(45) Date of Patent: Feb. 12, 2008

(54) METHOD OF DESCRIBING PATTERN REPETITIVENESS OF IMAGE

(75) Inventors: Hyun-doo Shin, Seongnam (KR); Yang-lim Choi, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 492 days.

(21) Appl. No.: 09/822,838

(22) Filed: Apr. 2, 2001

(65) Prior Publication Data

US 2002/0037113 A1    Mar. 28, 2002

Related U.S. Application Data

(60) Provisional application No. 60/207,957, filed on May 31, 2000.

(30) Foreign Application Priority Data

Oct. 19, 2000    (KR) ............................... 2000-61545

(51) Int. Cl.
*G06K 9/40*    (2006.01)
(52) U.S. Cl. .................... 382/275; 382/269
(58) Field of Classification Search .............. 382/171, 382/269, 264, 265, 270, 275, 251–253, 260–266, 382/274; 348/666; 375/254, 296, 284–285, 375/346; 358/3.29
See application file for complete search history.

(56) References Cited

U.S. PATENT DOCUMENTS

| | | | |
|---|---|---|---|
| 3,688,266 A | * | 8/1972 | Watanabe et al. ........... 382/267 |
| 5,028,991 A | * | 7/1991 | Sekizawa et al. ........... 358/537 |
| 5,280,289 A | | 1/1994 | Root |
| 5,291,282 A | * | 3/1994 | Nakagawa et al. ..... 375/240.23 |
| 5,293,433 A | | 3/1994 | Bernsen et al. |
| 5,627,916 A | * | 5/1997 | Horiuchi ..................... 382/239 |
| 5,790,711 A | * | 8/1998 | Murakami .................. 382/267 |

(Continued)

FOREIGN PATENT DOCUMENTS

EP    0498656 A1 *    2/1992

(Continued)

OTHER PUBLICATIONS

Yiu-Hung Fok, et al., "A Fast Block Matching Algorithm in Feature Domain", Department of Electrical and Electronic Engineering the Hong Kong University of Science and Technology Clear Water Bay, Hong Kong.

(Continued)

*Primary Examiner*—Brian Le
(74) *Attorney, Agent, or Firm*—Sughrue Mion, PLLC

(57) ABSTRACT

A method for describing pattern repetitiveness which may exist within an image, is provided. The method of describing pattern repetitiveness of an image comprises: (a) projecting an image on a predetermined axis having a predetermined direction, (b) decomposing the projected image down one level, (c) increasing a threshold value while a pattern quantizing value is retained, and denoising the decomposed data, and (d) describing pattern repetitiveness of the image using the pattern quantizing value of the denoised data and the threshold value used for denoising. Because the method of describing pattern repetitiveness of an image effectively denoises the original image without damaging the pattern repetitiveness of the original image, and the pattern repetitiveness is described using the denoised data, it is possible to describe more definite pattern repetitiveness.

12 Claims, 2 Drawing Sheets

U.S. PATENT DOCUMENTS

| | | | | |
|---|---|---|---|---|
| 5,805,933 A | * | 9/1998 | Takahashi | 710/72 |
| 5,825,419 A | * | 10/1998 | Mishima et al. | 375/240.15 |
| 5,832,118 A | * | 11/1998 | Kim | 382/224 |
| 5,859,921 A | * | 1/1999 | Suzuki | 382/118 |
| 6,181,823 B1 | * | 1/2001 | Takahashi | 382/232 |
| 6,351,556 B1 | * | 2/2002 | Loui et al. | 382/164 |
| 6,574,374 B1 | * | 6/2003 | Acharya | 382/257 |
| 6,771,813 B1 | * | 8/2004 | Katsuyama | 382/165 |

FOREIGN PATENT DOCUMENTS

| | | |
|---|---|---|
| JP | 60-059473 | 4/1985 |
| JP | 61-201373 | 9/1986 |

OTHER PUBLICATIONS

Wavelet expansion of Operator Kernel, Next: The Convolution Operator Up: Nonstandard Wavelet Decomposition Previous: Introduction.

Mu-Yen Chen, et al.; "Radar image denoising by recursive thresholding"; Proceedings of the International Conference on Image Processing (ICIP) Lausanne, Sep. 16-19, 1996, New York; IEEE; vol. 1; Sep. 16, 1996; pp. 395-398; XP010202230.

Argenti F. et al.; "Transmission of wavelet transform coded TV images on a noisy channel"; Proceedings of the International Conference on Communications (ICC); Geneva, May 23-26, 1993; New York; IEEE; vol. 3; May 23, 1993; pp. 386-390; XP010136929.

Yiu-Hung Fok, et al., "A Fast Block Matching Algorithm in Feature Domain", Department of Electrical and Electronic Engineering the Hong Kong University of Science and Technology Clear Water Bay, Hong Kong, Sep. 17, 2007.

Wavelet expansion of Operator Kernel, Next: The Convolution Operator Up: Nonstandard Wavelet Decomposition Previous: Introduction, Sep. 17, 2007.

* cited by examiner

METHOD OF DESCRIBING PATTERN REPETITIVENESS OF IMAGE

This application claims the benefit under 35 U.S.C. § 119(e)(1) of and incorporates by reference U.S. Provisional Application No. 60/207,957 filed on May 31, 2000. This application also incorporates by reference Korean Patent Application No. 00-61545 filed on Oct. 19, 2000.

BACKGROUND OF THE INVENTION

1. Field of the Invention

The present invention relates to a method of describing periodic pattern repetitiveness of an image, and more particularly, to a method for exactly describing a periodic pattern by effectively denoising of an image.

2. Description of the Related Art

To distinguish an image from another image in image data, it is regarded as important to give attention to or perceive a coherent pattern. This is regarded to be very important for purposes such as storing, sorting, and retrieval of image for image recognition and image manipulation. Also, this is a decisive element to obtain a better performance of pattern perception in a specific field of pattern matching using texture features.

In U.S. Pat. No. 09/272,321 filed on Mar. 19, 1999 by the present applicant and incorporated herein by reference, a method for vertically or horizontally projecting raw pixel values is provided. The method for vertically or horizontally projecting raw pixels is described as an effective method for extracting a peculiar pattern within image data. According to the method, if a repetitive pattern is included in an image, the pattern is definitely indicated within the projected image. Also, in the above-identified patent, it is disclosed that an auto-correlation method is applied to the resultant projected image, and periodic characteristics can be identified or magnified. However, pattern repetitiveness found within the projected image does not have a fine period in general due to a combination of other repetitive patterns and noise. Particularly, because noise within an image tends to make the pattern ambiguous, it is necessary to remove noise.

A conventional method for reducing noise using an automatized periodic pattern counting mechanism can partially solve the problem. However, if the noise is removed, there is a problem in that the pattern repetitiveness of the image is changed.

SUMMARY OF THE INVENTION

To solve the above problems, it is an objective of the present invention to provide a method which can effectively describe pattern repetitiveness which may exist within an image.

To solve the above problems, it is another objective of the present invention to provide a method for grouping images having similar texture features within an image database in which a plurality of images are stored on the basis of the pattern repetitiveness describing method.

Accordingly, to achieve the above objectives, there is provided a pattern repetitiveness describing method of an image according to an aspect of the present invention including: (a) projecting an image on a predetermined axis having a predetermined direction; (b) decomposing the projected image down one level; (c) increasing a threshold value while a pattern quantizing value is retained, and denoising the decomposed data; and (d) describing pattern repetitiveness of an image using the pattern quantizing value of the denoised data and the threshold value used for denoising.

Also, the decomposition is preferably based on a discrete wavelet transform.

Also, step (c), preferably, includes: (c-1) calculating a pattern quantizing value of the projected image; (c-2) decomposing the projected image down one level; (c-3) denoising the decomposed result data using a predetermined threshold value; (c-4) calculating a pattern quantizing value of the denoised data; (c-5) determining whether a previous pattern quantizing value is identical to a current pattern quantizing value; (c-6) increasing the threshold value and returning to step (c-3) if the previous pattern quantizing value and the current pattern quantizing value are identical; and (c-7) determining the previous pattern quantizing value as a final pattern quantizing value if the previous quantizing value and the current quantizing value are not identical.

Also, step (d) preferably includes (d') describing pattern repetitiveness of an image on the basis of the pattern quantizing value and the threshold value determined in the step (c-7).

To achieve the above objectives, there is provided a pattern repetitiveness describing method of an image according to another aspect of the present invention including: (a) projecting an image on a predetermined axis having a predetermined direction; (b) decomposing the projected image while the level in which a previous pattern quantizing value and a pattern quantizing value after the decomposition are retained as they are, and denoising; and (c) describing pattern repetitiveness of an image using either the pattern quantizing value of the data from which at least a level number and noise are removed, and the threshold value used for denoising.

To achieve another objective, there is provided a method for grouping images having similar texture characteristics within an image database in which a plurality of images are stored, according to one aspect of the present invention, the method including: (a) projecting an image on a predetermined axis having a predetermined direction; (b) decomposing the projected data down one level; (c) increasing a threshold value while a pattern quantizing value is retained, and denoising the decomposed data; (d) determining pattern repetitiveness vectors having a pattern quantizing value of the denoised data and a threshold value used for denoising as pattern repetitiveness descriptors of images; and (e) grouping images having similar texture characteristics using the pattern repetitiveness descriptor of the image.

To achieve the above objectives, there is provided a method for grouping images according to another aspect of the present invention, wherein a method for grouping images having similar texture characteristics within an image database in which a plurality of images are stored includes: (a) projecting an image on a predetermined axis having a predetermined direction; (b) denoising by decomposing the image while the level at which a previous pattern quantizing value and a pattern quantizing value after the decomposition are retained; (c) determining the level number of the denoised data, the pattern quantizing value, and the threshold value used for denoising as a pattern repetitiveness descriptor of the image; and (e) grouping images having similar texture characteristics using the pattern repetitiveness descriptor of the image.

BRIEF DESCRIPTION OF THE DRAWINGS

The above objective(s) and advantages of the present invention will become more apparent by describing in detail a preferred embodiment thereof with reference to the attached drawings in which.

DETAILED DESCRIPTION OF THE INVENTION

Hereinafter, preferred embodiments of the present invention will be described in greater detail with reference to the appended drawings.

Figure 1:
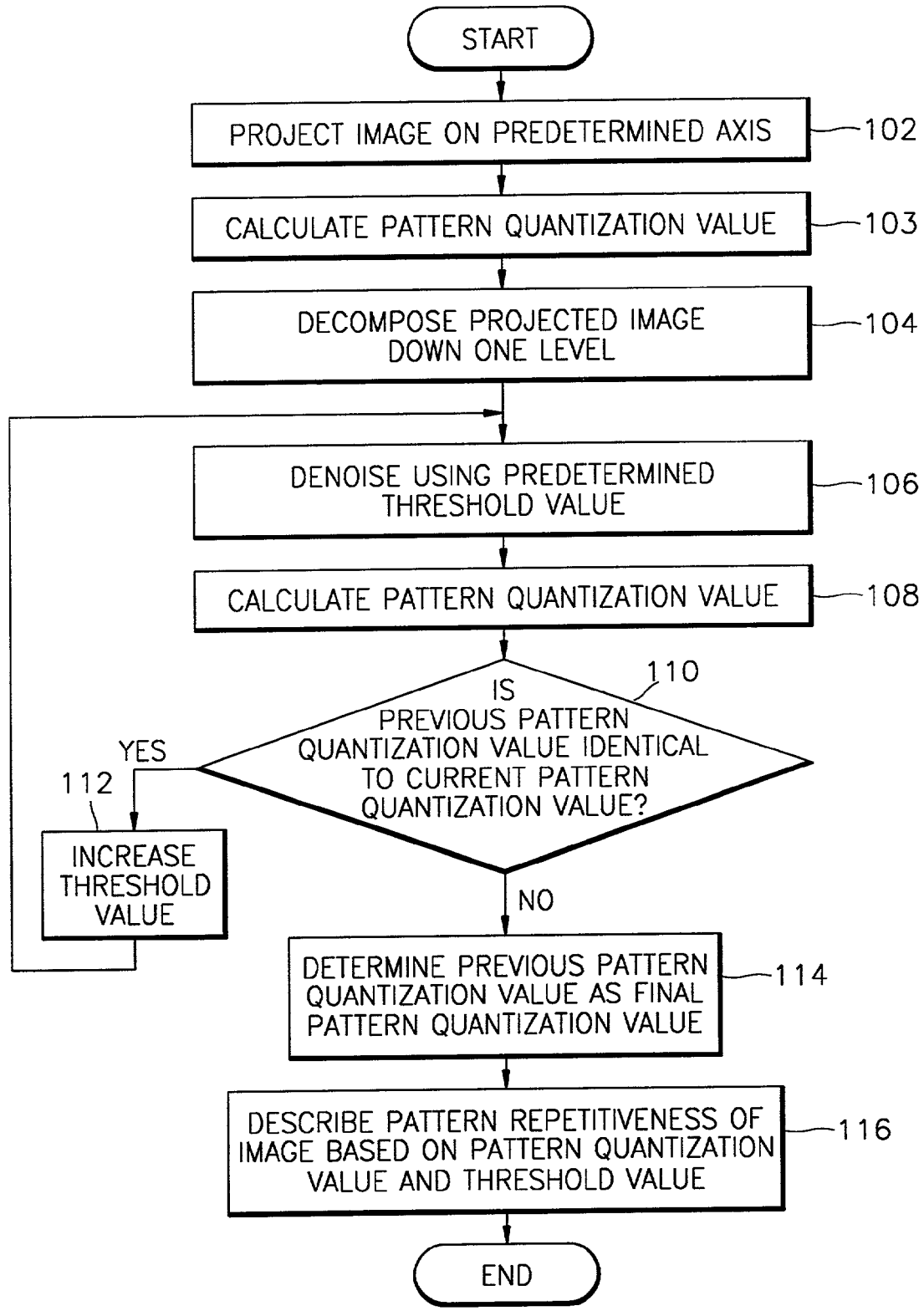
FIG. 1 is a flowchart illustrating the main steps of a method of describing pattern repetitiveness of an image according to a first preferred embodiment of the present invention.

FIG. 1 is a flowchart illustrating the main steps of a method of describing pattern repetitiveness of an image according to a first preferred embodiment of the present invention. Referring to FIG. 1, first, an image is projected on a predetermined axis having a predetermined direction (step 102). A pattern quantizing value of the projected image is calculated (step 103). It is possible to use a general known automatized scheme such as a counting algorithm or the calculation of the quantizing value by the naked eye, so that a quantizing value determined on the basis of the pattern repetitiveness period is obtained. Hereinafter, the quantizing value is indicated as P.

Now, the projected image is decomposed down one level (step 104). Here, the decomposition can be performed on the basis of a discrete wavelet transform. Because the wavelet transform acts as a step of denoising, a low frequency component is extracted from the projected image by the wavelet transform. For example, if the length of feature vectors $\overline{A}$ indicating a projection is $2^n$, the respective feature vectors can be decomposed into n levels. That is, the feature vectors $\overline{A}$ can be indicated as $$\overline{A} = (\alpha_1, \alpha_2, \alpha_3, \ldots, \alpha_{2^n}) \quad (1)$$

Also, the feature vectors $\overline{A}$ can be decomposed into an averaged sum $\overline{A}^1$ and an averaged difference $\overline{D}^1$. That is, it can be rewritten as $\overline{A} = \overline{A}^1 + \overline{D}^1$.

Also, when L is the length of a support of wavelet used, and basis vectors $\overline{V}_1^1$ within a scaling space are $$\overline{V}_1^1 = (0, 0, 0, \ldots, \alpha_1, \alpha_2, \ldots \alpha_L, 0, \ldots 0) \quad (2)$$

and basis vectors $\overline{W}_1^1$ within a wavelet space combined with the scaling space are $$\overline{W}_1^1 = (0, 0, 0, \ldots, \beta_1, \beta_2, \ldots \beta_L, 0, \ldots 0) \quad (3)$$

the averaged sum $\overline{A}^1$ and the averaged difference $\overline{D}^1$ can be indicated respectively as $$\overline{A}^1 = \sum_{i=1}^{t=2^{n-1}} (\overline{A} \cdot \overline{V}_1^1) \overline{V}_1^1 \quad (4)$$

$$\overline{D}^1 = \sum_{i=1}^{t=2^{n-1}} (\overline{A} \cdot \overline{W}_1^1) \overline{W}_1^1 \quad (5)$$

To keep a certain periodicity, the basis vectors would be wrapped around to the start. That is, the number of zeros to be placed from the left in each of the vectors is determined by a subscript i to be 2i.

There exists a relationship between α's and β's which make the use of terms of the averaged sum and the averaged difference on a scaling coefficient and a wavelet coefficient respectively rather appropriate. For example, the relationship is the following:

$$\beta_i = -1^{i+1} \alpha_{L+1-i}.$$

Then, using the following formulas, $$\overline{A}^k = \sum_{i=1}^{t=2^{n-k}} (\overline{A}^{k-1} \cdot \overline{V}_1^k) \overline{V}_1^k \quad (6)$$

$$\overline{D}^k = \sum_{i=1}^{t=2^{n-k}} (\overline{A}^{k-1} \cdot \overline{W}_1^k) \overline{W}_1^k \quad (7)$$

a successive decomposition can be done on the previous averaged sum. Due to the nature of the calculation for decomposing into the averaged sum and the averaged difference, in the averaged sum, almost all essential information for describing original feature vectors would be retained, whereas in the averaged difference, the feature vector portions belonging to highly changeable realms would be retained. In this preferred embodiment, an example in which an image is decomposed down one level to generally denoise will be described.

Next, denoising from the result data decomposed using a predetermined threshold value is performed (step 106), and a pattern quantizing value of the denoised data is calculated (step 108).

It is determined whether the previous pattern quantizing value is identical to the current quantizing value (step 110). The case where the previous quantizing value is identical to the current quantizing value means that pattern regularity has not changed and has been retained even though the data has been denoised using the corresponding threshold value. However, the case where the previous pattern quantizing value is different from the current quantizing value means that pattern regularity changed when the data was denoised using the corresponding threshold value.

Therefore, if the previous pattern quantizing value is identical to the current pattern quantizing value, the threshold value is increased (step 112) to perform step 106. If the previous pattern quantizing value is not identical to the current pattern quantizing value, the previous pattern quantizing value is determined as a final pattern quantizing value (step 114). Now, the pattern repetitiveness of the image is described on the basis of the pattern quantizing value obtained in step 114 and the threshold value (step 116). The quantizing value and the threshold value are indicated as numbers, and it is possible to describe the pattern repetitiveness of the image expressed using the numbers. Also, according to the method of describing pattern repetitiveness of an image, the image is effectively denoised, so that the pattern repetitiveness of the image can be effectively described.

According to the pattern repetitiveness describing method, information about the pattern repetitiveness of the image is extracted, and denoising is performed with reference to the extracted pattern repetitiveness, so that the original image is effectively denoised without damaging the pattern repetitiveness of the image. Also, more definite pattern repetitiveness is obtained by denoising, and the images having periodic patterns can be classified in detail and stored by indexing using the quantizing value decided on the basis of the pattern repetitiveness of the obtained image.

Figure 2:
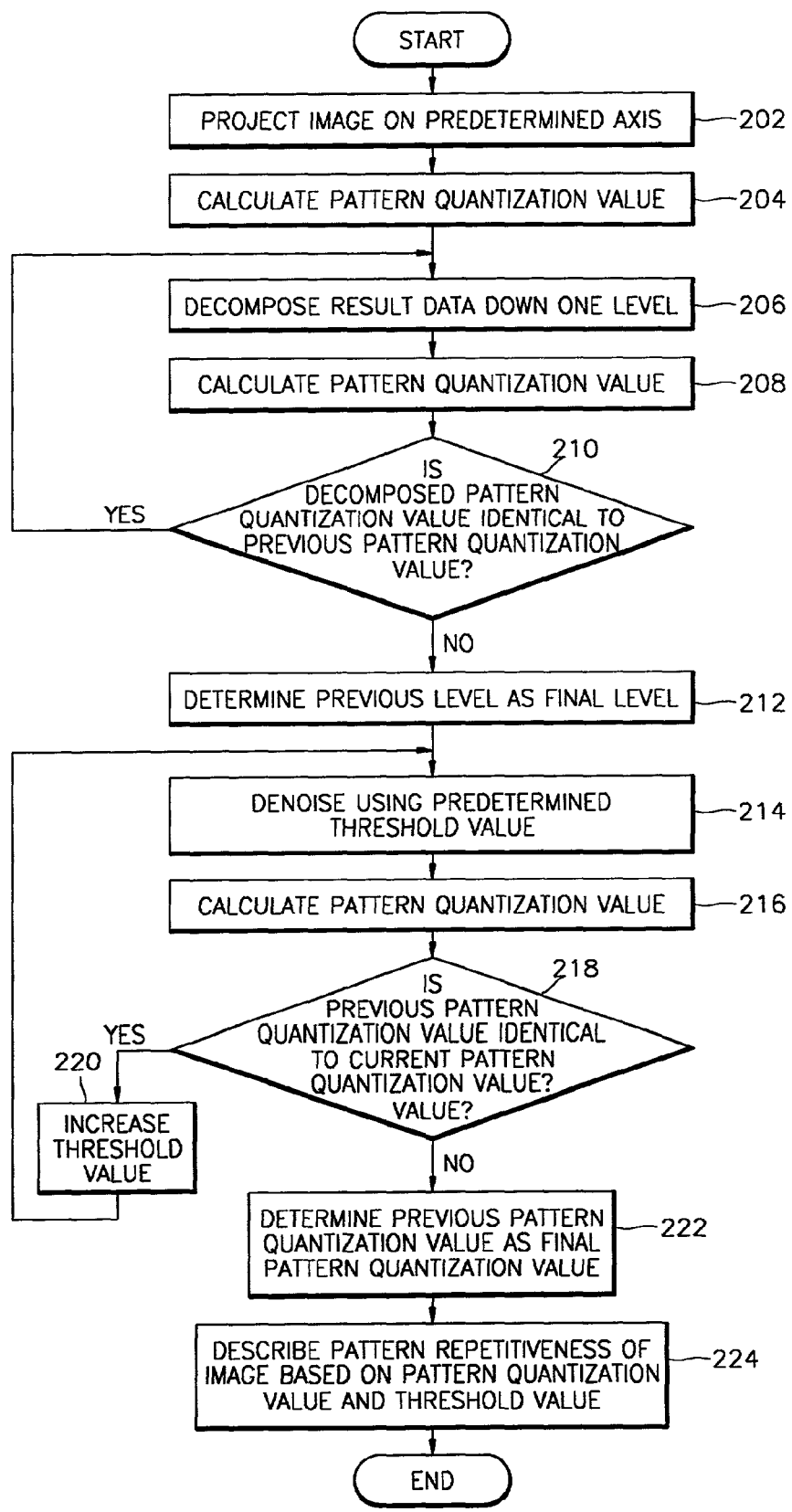
FIG. 2 is a flowchart illustrating the main steps of a method of describing pattern repetitiveness of an image according to a second preferred embodiment of the present invention.

In the above described first preferred embodiment, an example, in which an image is decomposed down one level is described. However, it is possible to decompose an image down a plurality of levels. FIG. 2 illustrates the main steps of a method of describing pattern repetitiveness of an image according to a second preferred embodiment of the present invention. Referring to FIG. 2, first, an image is projected on an axis having a predetermined direction (step 202). A pattern quantizing value of the projected image is calculated (step 204). It is possible to use an automatized scheme such as a digitization algorithm or for the calculation of the quantizing value by the naked eye, so that a quantizing value decided on the basis of the repetitiveness period of the pattern is obtained. Hereinafter, the quantizing value is indicated as P.

Now, the projected image is decomposed down one level (step 206), and the quantizing value of the decomposed result data is calculated (step 208). Next, it is determined whether the previous pattern quantizing value is identical to the pattern quantizing value after the decomposition (step 210).

The case where the previous pattern quantizing value is identical to the pattern quantizing value after the decomposition means that pattern regularity has not changed even though the decomposed image has been denoised. However, the case where the previous pattern quantizing value is not identical to the pattern quantizing value after the decomposition means that pattern regularity has changed due to the denoising of the decomposed image.

Therefore, if the previous pattern quantizing value is identical to the pattern quantizing value after the decomposition, step 206 is performed, so that the result data is decomposed down one level, and the pattern quantizing value of the decomposed data is calculated (step 208), to determine whether the previous pattern quantizing value is identical to the pattern quantizing value after the decomposition (step 210). However, if the previous pattern quantizing value is not identical to the pattern quantizing value after the decomposition, a previous level is determined as a final level (step 212). Hereby, the decomposition is performed while the level at which the previous pattern quantizing value and the pattern quantizing value after the decomposition are retained as they are.

Now, the data of the level determined in the step 212 is denoised using a predetermined threshold value (step 214). Next, the pattern quantizing value of the denoised data is calculated (step 216), and it is determined whether the previous pattern quantizing value is identical to the current pattern quantizing value (step 218).

If it is determined that the previous pattern quantizing value is not identical to the current pattern quantizing value, the previous pattern quantizing value is determined as the final pattern quantizing value (step 222). If it is determined that the previous pattern quantizing value is identical to the current pattern quantizing value, the threshold value is increased (step 220), and steps 214, 216, and 218 are repeatedly performed, so that the image is denoised while the threshold at which the current pattern quantizing value and the previous pattern quantizing value are retained as they are. Now, the pattern repetitiveness of the image will be described on the basis of the level number, pattern quantizing value, and the threshold value (step 224).

According to the pattern repetitiveness describing method of the present invention, the information about the pattern repetitiveness within the image is extracted, and the denoising is performed with reference to the information about the extracted pattern repetitiveness, so that the image is effectively denoised without damaging the pattern repetitiveness within the original image. Also, more definite pattern repetitiveness is obtained by denoising, and the images having the patterns can be classified in detail and stored by indexing using the quantizing value decided on the basis of the pattern repetitiveness of the obtained image.

Also, the method of describing pattern repetitiveness of an image can be applied to image indexing methods, and to grouping of the images having similar texture features within an image database in which a plurality of images are stored.

According to the method of grouping images, as described in the method of describing pattern repetitiveness of an image according to the first preferred embodiment of the present invention, the threshold value is increased while the pattern quantizing value is retained, and the decomposed data is denoised. The pattern repetitiveness vectors including the pattern quantizing value of the denoised data and the threshold value used for denoising are designated as pattern repetitiveness descriptors of the images. It is possible to group images having similar texture characteristics using the pattern repetitiveness descriptor of the image.

Also, according to the method of grouping images, as described in the method of describing pattern repetitiveness of an image according to the second preferred embodiment of the present invention, the decomposition is performed while the level at which the previous pattern quantizing value and the pattern quantizing value after the decomposition are retained as they are, so that the image is denoised, and the level number of the denoised data, the pattern quantizing value, and the threshold value used for denoising are determined as the pattern repetitiveness descriptor of the image. It is possible to group images having similar texture characteristics using the pattern repetitiveness descriptor of the image.

According to the methods of grouping images as described above, the grouping is performed using the effectively denoised pattern repetitiveness, so that the performance of the grouping can be enhanced.

The method of describing pattern repetitiveness of an image according to the present invention can be written as a program executed on a personal or server computer. Program codes and code segments forming the program can be easily induced by computer programmers skilled in the art. Also, the program can be stored in computer-readable recording media. The recording media may be magnetic recording media, optical recording media, or broadcast media.

The pattern repetitiveness describing method extracts information about the pattern repetitiveness of the image, and performs denoising with reference to the information about the extracted pattern repetitiveness to effectively denoise the original image without damaging the pattern repetitiveness of the original image. Also, more definite pattern repetitiveness can be obtained by denoising. Hereby, images having patterns can be classified in detail and stored by indexing using an exact quantizing value decided on the basis of definite pattern repetitiveness when a general known indexing scheme is applied.

What is claimed is:

1. A method of describing pattern repetitiveness of an image comprising the steps of:
   (a) projecting an image on a predetermined axis having a predetermined direction;

(b) decomposing the projected image down one level;
(c) increasing a threshold value used for denoising if a previous pattern quantizing value is identical to a current pattern quantizing value, and denoising the decomposed data; and
(d) describing pattern repetitiveness of the image using the pattern quantizing value of the denoised data and the threshold value used for denoising.

2. The method of claim 1, wherein the decomposition is based on a discrete wavelet transform.

3. The method of claim 1, wherein step (c) comprises the steps of:
  (c-1) calculating the pattern quantizing value of the projected image;
  (c-2) decomposing the projected image down one level;
  (c-3) denoising the decomposed result data using a predetermined threshold value;
  (c-4) calculating the pattern quantizing value of the denoised data;
  (c-5) discriminating whether the current pattern quantizing value is identical to the previous pattern quantizing value;
  (c-6) increasing the threshold value used for denoising if the current pattern quantizing value is identical to the previous pattern quantizing value, and returning to step (c-3); and
  (c-7) determining the previous pattern quantizing value as a final pattern quantizing value if the current pattern quantizing value is not identical to the previous pattern quantizing value.

4. The method of claim 3, wherein step (d) comprises:
  (d') describing the pattern repetitiveness of the image on the basis of the pattern quantizing value determined in the step (c-7) and the threshold value used for denoising.

5. The method of claim 1, wherein the decomposing is based on a discrete wavelet transform.

6. The method of claim 1, wherein step (b) comprises the steps of:
  (b-1) calculating the pattern quantizing value of the projected image;
  (b-2) decomposing the projected image down one level;
  (b-3) calculating the quantizing value of the decomposed result data;
  (b-4) determining whether the previous pattern quantizing value is identical to the pattern quantizing value after the decomposition;
  (b-5) if the previous pattern quantizing value is identical to the pattern quantizing value after the decomposition, returning to step (b-2); and
  (b-6) if the previous pattern quantizing value is not identical to the pattern quantizing value after the decomposition, determining a previous level as a final level.

7. The method of claim 6, wherein the pattern repetitiveness describing method of the image further comprises the steps of:
  (b-7) denoising data of the level determined in the step (b-6) using a predetermined threshold value;
  (b-8) calculating the pattern quantizing value of the denoised data;
  (b-9) determining whether the current pattern quantizing value is identical to the previous pattern quantizing value;
  (b-10) if the current pattern quantizing value is identical to the previous pattern quantizing value, increasing the threshold value used for denoising, and returning to step (b-7); and
  (b-11) if the current pattern quantizing value is not identical to the previous pattern quantizing value, determining the previous pattern quantizing value as a final pattern quantizing value.

8. The method of claim 1, wherein the step (c) comprises increasing the threshold value until the pattern quantizing value changes.

9. The method of claim 1, wherein the step (c) comprises increasing the threshold value used for denoising if a current pattern quantizing value is identical to a previous pattern quantizing value.

10. The method of claim 1, wherein the step (c) comprises:
  denoising the decomposed result data using a predetermined threshold value;
  calculating a current pattern quantizing value of the denoised data;
  increasing the threshold value used for denoising if the current pattern quantizing value is identical to a previous pattern quantizing value.

11. A method of grouping images having similar texture characteristics within an image database in which a plurality of images are stored, the method comprising the steps of:
  (a) projecting an image on a predetermined axis having a predetermined direction;
  (b) decomposing the projected image down one level;
  (c) increasing a threshold value used for denoising if a previous pattern quantizing value is identical to a current pattern quantizing value, and denoising the decomposed data;
  (d) determining pattern repetitiveness vectors including the pattern quantizing value of the denoised data and the threshold value used for denoising as pattern repetitiveness descriptors of images; and
  (e) grouping images having similar texture characteristics using the pattern repetitiveness descriptors of the images.

12. A method of describing pattern repetitiveness of an image, the method comprising:
  projecting an image on a predetermined axis to generate a projected image;
  calculating a pattern quantization value;
  decomposing the projected image down one level;
  denoising using a predetermined threshold value;
  calculating a current pattern quantization value;
  determining if a previous pattern quantization value is identical to a current pattern quantization value;
  if the previous pattern quantization value is identical to the current pattern quantization value, increasing a threshold value used for denoising and repeating the denoising at the increased threshold value; and
  if the previous pattern quantization value is not identical to the current pattern quantization value, determining previous pattern quantizing value as a final pattern quantization value and describing pattern repetitiveness of image based on the final pattern quantization value and the threshold value used for denoising.

* * * * *